UNITED STATES PATENT OFFICE 2,401,336

MANUFACTURE OF KETALS AND OTHER DERIVATIVES OF 1,2-DIKETONES

Douglas S. Calder and Kenneth Bryson Fleer, Memphis, Tenn., assignors to Forest Products Chemical Company, Memphis, Tenn., a corporation of Tennessee No Drawing. Application December 3, 1943, Serial No. 512,812

5 Claims. (Cl. 260—594)

This invention relates to manufacture of ketals and other derivatives of 1,2-diketones; and it comprises a method of making new ketal compounds from 1,2-diketones, such as diacetyl, wherein such a diketone is reacted with an excess of a monohydric, primary alcohol in the presence of a small amount of an acetal-forming catalyst, such as sulfuric acid, whereby the corresponding 1,1-dialkoxy-2-keto compound (monoacetal) is formed. The invention also includes the further process step of reacting the said ketal ketone with a compound, which is reactive either with the keto group or with an alpha hydrogen group, thereby forming an 1,1-dialkoxy derivative, this step advantageously taking place in the presence of an alkaline medium to stabilize the alkoxy groups and being sometimes followed by reacting the 1,1-dialkoxy derivative with a compound which produces a secondary derivative by reacting either with the alkoxy groups, the keto group or the alpha hydrogen group remaining after the first reaction. Tertiary derivatives can then be formed by a third reaction, if desired. The invention also includes the alternative procedure of hydrolyzing the 1,1-dialkoxy derivative to form a 1-keto-derivative, followed by other reactions to form secondary or tertiary derivatives, if desired. The invention further includes the ketals produced by the described process as new compounds; all as more fully hereinafter set forth and as claimed.

It is well known that, while aldehydes can be converted into acetals by reaction with primary alcohols in the presence of various catalysts, ketones in general do not react with primary alcohols to form acetals. It has been thought necessary to employ orthoformic esters to produce acetals from ketones. But orthoformic esters, when reacted with 1,2-diketones, form diacetals. It is also known that mono- and di-cyclic acetals can be formed by reacting 1,2-diketones with polyhydric alcohols. We have now discovered that a new series of ketone acetals or, more properly, ketals, can be produced by reacting aliphatic 1,2-diketones in general with monohydric, primary alcohols in excess in the presence of acetal-forming or acetalizing catalysts, i. e. catalysts which are capable of catalyzing the reaction between aldehydes and alcohols to form acetals. It is presumed that the explanation for this unexpected result lies in the fact that the carbonyl group, which reacts with the alcohol, is activated by the presence of the adjacent carbonyl group. We have also discovered that ketals are formed exclusively by this reaction, which indicates that these compounds do not readily disproportionate. In addition we have discovered that the reaction to form ketals does not occur with secondary or tertiary alcohols, which is another surprising result.

It seems rather strange that the described reaction between primary alcohols and 1,2-diketones has not been discovered earlier. A possible explanation is that workers in this art may have assumed that, in order to convert 1,2-diketones into acetals, it would be necessary to employ orthoformic esters and that, when these were tested, it was found that diacetals only were formed.

The fact that a ketal is formed, rather than a diacetal or a hemiacetal, has been established by an extended series of experiments. These tests indicate that the equation of the reaction, which takes place resulting in the formation of the ketals, can be expressed as follows, using methyl alcohol and diacetyl as examples of the alcohol and the diketone, respectively:

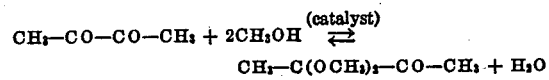

Our new products therefore have the general formula:

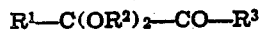

wherein $R^1$, $R^2$ and $R^3$ are alkyl groups.

In making the new compounds we have found that it is important to have the alcohol present somewhat in excess of the molecular proportions indicated in the above equation. The reaction is an equilibrium reaction and hence, in order to obtain satisfactory yields, it is necessary to have at least one of the reacting components in excess in order to displace the equilibrium to the right.

It is also important to keep the water present at as low a value as possible, since the yield falls off rapidly as the water increases. For example, when a substantially anhydrous alcohol is employed, yields of 75 to 80 per cent can be obtained, whereas with a 50 per cent alcohol the yield is reduced to about 6 per cent. If a 30 per cent alcohol is employed, the yield drops off still further. It is therefore important to employ an alcohol in our process having a concentration of at least about 30 per cent and preferably one having a concentration of over 50 per cent by volume. For the same reason the yield can be increased by conducting the process in the presence of a water absorbing agent, such as anhydrous magnesium sulfate, calcium sulfate or the like. Such agents absorb the water as it is formed during the reaction and increase the yield substantially.

The catalyst which can be used in forming the ketals of this invention are the same as those which are capable of forming acetals from mixtures of aldehydes and alcohols. A large number of catalytic substances are known to be useful for this purpose, among which there can be mentioned ammonium chloride, mineral acids, calcium chloride, zinc chloride, ferric chloride, boron trichloride, aromatic sulfonic acids, boron trifluoride, Twitchell's reagent, etc. Hydrolyzing catalysts as well as acid catalysts in general are effective both for producing the ketals of this invention as well as for hydrolyzing them after formation, which indicates rather clearly that an equilibrium reaction is involved which follows the rules of mass action. These catalysts can be employed in small amounts ranging from about 0.05 to 5 per cent by weight, for example. When mineral acids are employed as catalysts it is advisable to employ less than about 5 per cent in order to avoid tar formation.

As indicated previously any of the monohydric, primary alcohols and any of the 1,2-diketones can be reacted to produce the new ketals of this invention. But we have found that the reactivity of the alcohols with 1,2-diketones to form our ketals falls off with increasing molecular weight of both the diketones and the alcohols. Our process is therefore particularly applicable to the low-molecular 1,2-diketones and low-molecular, primary, monohydric alcohols. In the ketals, which are formed from straight chain diketones in which the adjacent keto groups are closer to one end of the chain than the other, the alkoxy groups of the ketals replace the keto group which is at the shorter end of the chain, that is the diketone 2,3-diketohexane, for example, forms a 2,2-dialkoxy-3-hexanone.

The ketals of our invention have been found useful for several purposes. They can be used as high boiling solvents in lacquer compositions and are valuable additions since they have some blending qualities. They are capable of dissolving a considerable percentage of water and/or hydrocarbon solvents, for example. They can be used as extenders of wood-preserving creosote oils. And they can be used as organic solvents in many organic reactions.

In making the new ketals it is only necessary to mix an excess of the alcohol with the diketone, to add a small amount of an acetal-forming catalyst and then either to let the mixture stand for several hours or to heat it to speed up the reaction. In most cases the reaction will go to substantial completion if the reaction mixture is allowed to stand at room temperatures for a period of from about 2 to 4 hours. A standing period of 24 hours or longer does no harm but does not substantially increase the yield. On the other hand, if the reaction mixture is refluxed for a period of about 15 to 45 minutes, maximum yields are obtained.

Our invention can be explained in greater detail by reference to the following specific examples which represent practical operating embodiments of our process of forming the new ketals.

*Example 1.—Preparation of diacetyl-dimethyl-ketal (2,2-dimethoxy-3-butanone)*

In this example we dissolved 100 parts of pure diacetyl (B. P. 88–91° C.) in 500 parts pure methanol. No heat effects were observed. We then added 2 parts of ammonium chloride and agitated the mixture. Thereupon a very definite warming was observed. After refluxing for half an hour, the mixture was allowed to stand over night, then made slightly alkaline with a dilute aqueous sodium carbonate solution, and fractionated. After several hundred parts of methanol were distilled away at about 65° C., the temperature then rose rather sharply to 80° C., and finally to 94° C., the boiling point of the ketal-water binary, when the distillate, which was water-white in color, was found to break into two phases. The upper layer was somewhat oily in nature and this was found to be 2,2-dimethoxy-3-butanone. This compound was separated from the aqueous layer and fractionated. As soon as a small quantity of aqueous heads was removed, a large fraction was obtained, constituting better than 80 per cent of the charge and boiling very flatly at 145–146° C., being water white in color. The new compound was found to have a specific gravity of 0.987 at 20/15° C. It does not freeze down to −82° C. and it forms an azeotrope with water boiling at about 93–94° C.

*Example 2.—Preparation of diacetyl-diethyl-ketal (2,2-diethoxy-3-butanone)*

1000 cc. of absolute ethanol (ordinary 95% ethanol may be used successfully) were mixed first with 2 cc. sulfuric acid and then with 200 cc. diacetyl. The mixture was allowed to reach equilibrium by standing over night. The following day the mixture was poured with stirring into 2000 cc. water containing 50 gms. dissolved NaOH, and the resulting brown mixture was fractionated. The first fraction consisted of water-white, 95% ethanol, pure except for containing 5% water, boiling at about 78–79° C. and amounting to about 900 cc. Then a small intermediate fraction was obtained while the temperature rose sharply to 95.5° C. At 95–96° C. all of the ketal steam distilled over. The distillate was decanted as before and the oily ketal collected. On redistillation, the ketal lost its water content to the heads, and the main fraction came over water-white at 163.5° C. It amounted to about 200 cc. If 95% alcohol is used the main fraction amounts to about 100 cc. The new compound has a specific gravity of 0.927 at 20/15° C.

*Example 3.—Preparation of diacetyl-di-n-propyl-ketal (2,2-di-n-propoxy-3-butanone)*

2 cc. sulfuric acid were added to 1000 cc. pure dry n-propanol and 200 cc. dry diacetyl were added. The mixture was allowed to react at room temperatures over night. It was then poured with stirring into 2000 cc. water containing 50 gms. dissolved NaOH. The resulting mixture was fractionated through a good column, when a homogeneous n-propanol-water binary was first obtained. This binary (71.7 wt. % n-propanol; 28.3 wt. % water) boiled at 87.5–88° C.

It amounted to about 1150 cc. (alcohol unreacted plus the water in the binary).

As soon as most of the alcohol was removed as the n-propanol-water binary, a small intermediate cut was taken while the temperature rose sharply to 98.5–99° C. when the ketal began to distill over the water vapor. The oily ketal was collected as before and redistilled, whereupon it dehydrated and boiled finally at 196–7° C. at 765 mm. In the case of n-propanol, like other higher alcohols which form water binaries, the constituents to be separated by distillation are:

(1) n-Propanol-water at 87.5–88° C.
(2) Ketal-water at 98.5–99° C.

When aqueous alkalies are used. If no water is used in the neutralization step, then the components to be separated by fractionation are:

(1) Small quantity of propanol-water at 87.5–88°
(2) n-Propanol at 97° C.
(3) Pure ketal at 196–7° C.

The pure di-n-propyl ketal amounted to a volume of about 200 cc. It had a specific gravity of 0.903 at 20/15° C.

*Example 4. — Preparation of diacetyl-di-n-butyl-ketal (2,2-di-n-butoxy-3-butanone)*

To 1000 cc. dry n-butanal was added 2 cc. sulfuric acid and then 200 cc. dry diacetyl. The mixture was stirred thoroughly, and allowed to stand over night, then poured with stirring into 2000 cc. water containing 50 gms. NaOH. The alkaline mixture was then fractionally distilled. The n-butanol-water heterogeneous binary boiling at 92.5° C. was first obtained. The distillate was continually decanted, the butanol being drawn off and the water returned to the still until all of the n-butanol was exhausted. The wet butanol collected amounted to about 1000 cc. total. Thereafter, the temperature of distillation rose sharply to 97–8° C., the appearance of the distillate changed, and the quantity of oil distilling with the water dropped sharply (reduction in vapor pressure of the oil layer from that of butanol to that of the di-butyl-ketal). The ketal then steam-distilled at 97–99° C. The ketal was collected, dried, and distilled as before, and was found to boil at 228–230° C. at 762 mm. Hg and to have a specific gravity of 0.895 at 20/15° C.

*Example 5.—Preparation of diacetyl-di-iso-butyl-ketal (2,2-di-iso-butoxy-3-butanone)*

1000 cc. dry iso-butyl alcohol (2-methyl-propanol-1) were mixed with 2 cc. sulfuric acid and then 200 cc. dry diacetyl were stirred in. The mixture was allowed to stand over night, poured with stirring into 2000 cc. water containing 50 gms. dissolved NaOH and distilled through a column. The first fraction of distillate consisted of the heterogeneous i-butanol-water binary (66.8 wt. % alcohol, 33.2 wt. % water) boiling at 89–90° C. By drawing off the alcohol layer and returning the water layer to the still until the alcohol was exhausted, 1000 cc. wet butanol were removed. The temperature then rose to about 98° C. and the desired ketal distilled over with the water. The ketal was collected, dried and redistilled, when it came over at 214–15° C. It had a specific gravity of 0.886 at 20/15° C.

*Example 6.—Preparation of acetyl propionyl dimethyl ketal (2,2-dimethoxy-3-pentanone)*

To 1000 cc. pure, dry methanol were added 2 cc. sulfuric acid and 200 cc. acetyl propionyl which had been previously dried. The mixture was allowed to stand over night, neutralized and fractionated. After the methanol distilled off at 64–65° C. the temperature rose sharply to 95.5–96° C. while a small intermediate cut was taken off. Thereafter the ketal steam distilled in normal fashion. The ketal was collected, dried and distilled when it came over at 162.5° C. Its specific gravity was 0.973 at 20/15° C.

It is evident from the above that the ketals of the present invention constitutes a complete series of compounds whose properties can be predicted with at least fair accuracy from their structural formulae. They are all colorless, limpid, somewhat oily liquids, only partially soluble in water but miscible with organic solvents. They all boil without decomposition at temperatures well above the boiling points of the diketones and the alcohols from which they are formed. The boiling points increase, the specific gravities decrease, and the water solubilities decrease with increasing molecular weight. All of these compounds can be readily hydrolyzed to give the alcohols and di-ketones from which they are formed. Partial hydrolysis can be produced merely by adding water to the ketals and distilling. But if a hydrolyzing catalyst is added, the hydrolysis goes to completion, giving a yellow colored distillate containing water, diketone and alcohol, from which it is possible to separate the diketone by various methods. The ketals are stable in alkaline solutions and unstable in the presence of any acids. Chemically they act as mono-ketones or, more accurately, as diketones in which one group is at least partly protected or blocked. Aromatic aldehydes, such as benzaldehyde and anisaldehyde, react with the alpha hydrogen atoms present to produce the so-called crotonization reaction. The ketals give the iodoform reaction, showing the presence of a carbonyl group; they develop alkali upon standing with a neutralized sodium sulfite solution; they react with Grignard reagents etc. A few strongly reactive keto-reactive compounds, such as hydroxylamine, phenylhydrazine and semicarbazides will react with both the protected carbonyl group as well as with the unprotected group. But the unprotected group alone can be reacted to produce dialkoxy-mono-derivatives with all keto-reactive compounds which are insufficiently reactive to react with the acetal group $(OR^2)_2$ and which can be reacted in anhydrous media or in neutral or alkaline aqueous media. These dialkoxy-mono-derivatives can then be hydrolyzed, if desired, to convert the acetal group to a keto group. And, if desired, this keto group can be reacted with any other keto-reactive compound to form mixed derivatives of the original diketones. This forms a convenient method of obtaining both mono-derivatives and mixed bis-derivatives of the 1,2-diketones.

Owing to the fact that the ketals are stable in alkaline media, condensation reactions which require the use of an alkaline catalyst are possible. For example, benzal diacetyl can be formed by reacting the ketal with benzaldehyde and an alkali. Condensation with nitroparaffins is possible. And acetoin can be produced by subjecting 2,2-dimethoxy-3-butanone to a reduction reaction in higher yield than directly from diacetyl. These and other reactions which are possible with our new ketals are outlined in the following table, using 2,2-dimethoxy-3-butanone as an example of the ketals.

| Reagent | Type reaction | Catalyst and conditions | Intermediate | Product after hydrolysis | Product of second similar reaction |
|---|---|---|---|---|---|
| R-CHO, where R=aryl. | Crotonization. | Aqueous-alcoholic alkalis. | $\text{CH}_3\text{-}\underset{\underset{\text{OCH}_3}{|}}{\overset{\overset{\text{OCH}_3}{|}}{\text{C}}}\text{-CO-CH=CH-R}$ | $\text{CH}_3\text{-CO-CO-CH=CH-R}$ | $\text{R-CH=CH-CO-CO-CH=CH-R}$ |
| RMgX, where R=aryl or alkyl. | Grignard. | Anhydrous ether. | $\text{CH}_3\text{O R}$ $\text{CH}_3\text{-}\underset{\underset{\text{CH}_3\text{O}}{|}}{\overset{|}{\text{C}}}\text{-}\underset{\underset{\text{OH}}{|}}{\overset{|}{\text{C}}}\text{-CH}_3$ | $\text{OH}$ $\text{CH}_3\text{-CO-}\underset{\underset{\text{R}}{|}}{\overset{|}{\text{C}}}\text{-CH}_3$ | $\text{HO OH}$ $\text{CH}_3\text{-}\underset{\underset{\text{R}}{|}}{\overset{|}{\text{C}}}\text{-}\underset{\underset{\text{R}}{|}}{\overset{|}{\text{C}}}\text{-CH}_3$ |
| XCH(R)COOEt R=aryl or alkyl. | Reformatsky. | Zn in anhydrous alcohol or ether. | $\text{CH}_3\text{O OH}$ $\text{CH}_3\text{-}\underset{\underset{\text{CH}_3\text{O}}{|}}{\overset{|}{\text{C}}}\text{-}\underset{\underset{\text{CHR-COOEt}}{|}}{\overset{|}{\text{C}}}\text{-CH}_3$ | $\text{CHR-COOEt}$ $\text{CH}_3\text{-CO-}\underset{\underset{\text{OH}}{|}}{\overset{|}{\text{C}}}\text{-CH}_3$ | $\text{HO CHR-COOEt}$ $\text{CH}_3\text{-}\underset{\underset{\text{EtOOC-CHR}}{|}}{\overset{|}{\text{C}}}\text{---}\underset{\underset{\text{OH}}{|}}{\overset{|}{\text{C}}}\text{-CH}_3$ |
| H+ | Alkaline reduction. | Aluminum and aqueous NaOH, etc. | $\text{CH}_3\text{O OH}$ $\text{CH}_3\text{-}\underset{\underset{\text{CH}_3\text{O}}{|}}{\overset{|}{\text{C}}}\text{-}\underset{\underset{\text{H}}{|}}{\overset{|}{\text{C}}}\text{-CH}_3$ | $\text{OH}$ $\text{CH}_3\text{-CO-}\underset{\underset{\text{H}}{|}}{\overset{|}{\text{C}}}\text{-CH}_3$ | $\text{HO OH}$ $\text{CH}_3\text{-}\underset{\underset{\text{H}}{|}}{\overset{|}{\text{C}}}\text{-}\underset{\underset{\text{H}}{|}}{\overset{|}{\text{C}}}\text{-CH}_3$ |
| RCH$_2$COOEt R=aryl or alkyl. | Claisen condensation of esters with methyl ketones. | Anhydrous NaOEt or metallic Na. | $\text{OCH}_3$ $\text{CH}_3\text{-}\underset{\underset{\text{OCH}_3}{|}}{\overset{|}{\text{C}}}\text{-CO-CH}_2\text{-}\underset{\underset{\text{CH}_2\text{R}}{\diagup}}{\text{CO}}$ | $\text{CH}_3\text{-CO-CO-CH}_2\text{-}\underset{\underset{\text{CH}_2\text{R}}{\diagup}}{\text{CO}}$ | $\underset{\underset{\text{CH}_2\text{R}}{\diagup}}{\text{CO}}\text{-CH}_2\text{-CO-CO-CH}_2\text{-}\underset{\underset{\text{CH}_2\text{R}}{\diagup}}{\text{CO}}$ |
| CO-OEt \| CO-OEt | Claisen condensation with oxal ester. | ...do... | $\text{OCH}_3$ $\text{CH}_3\text{-}\underset{\underset{\text{OCH}_3}{|}}{\overset{|}{\text{C}}}\text{-CO-CH}_2\text{-}\underset{\underset{\text{COOEt}}{\diagup}}{\text{CO}}$ | $\text{CH}_3\text{-CO-CO-CH}_2\text{-}\underset{\underset{\text{COOEt}}{\diagup}}{\text{CO}}$ | $\underset{\underset{\text{COOEt}}{\diagup}}{\text{CO}}\text{-CH}_2\text{-CO-CO-CH}_2\text{-}\underset{\underset{\text{COOEt}}{\diagup}}{\text{CO}}$ |
| RCH$_2$NO$_2$ (nitroparaffins) R=alkyl. | Frazer, Kon Haas, etc. | Anhydrous ZnCl$_2$, tertiary amines, etc. | $\text{CH}_3\text{O CHRNO}_2$ $\text{CH}_3\text{-}\underset{\underset{\text{CH}_3\text{O}}{|}}{\overset{|}{\text{C}}}\text{-}\underset{\underset{\text{OH}}{|}}{\overset{|}{\text{C}}}\text{-CH}_3$ or $\text{CH}_3\text{O CHRNO}_2$ $\text{CH}_3\text{-}\underset{\underset{\text{CH}_3\text{O}}{|}}{\overset{|}{\text{C}}}\text{-}\underset{\underset{\text{CHRNO}_2}{|}}{\overset{|}{\text{C}}}\text{-CH}_3$ | $\text{CHRNO}_2$ $\text{CH}_3\text{-CO-}\underset{\underset{\text{OH}}{|}}{\overset{|}{\text{C}}}\text{-CH}_3$ or $\text{CHRNO}_2$ $\text{CH}_3\text{-CO-}\underset{\underset{\text{CHRNO}_2}{|}}{\overset{|}{\text{C}}}\text{-CH}_3$ | $\text{HO CHRNO}_2$ $\text{CH}_3\text{-}\underset{\underset{\text{HO}}{|}}{\overset{|}{\text{C}}}\text{-}\underset{\underset{\text{CHRNO}_2}{|}}{\overset{|}{\text{C}}}\text{-CH}_3$ or $\text{O}_2\text{NRHC CHRNO}_2$ $\text{CH}_3\text{-}\underset{\underset{\text{O}_2\text{NRHC}}{|}}{\overset{|}{\text{C}}}\text{-}\underset{\underset{\text{CHRNO}_2}{|}}{\overset{|}{\text{C}}}\text{-CH}_3$ |
| Anhydrous aliphatic acid or its anhydride + anhydrous sodium salt of the acid RCH$_2$COOH R=alkyl. | Perkin. | Anhydrous. | $\text{CH}_3\text{O CR-COOH}$ $\text{CH}_3\text{-}\underset{\underset{\text{OCH}_3}{|}}{\overset{|}{\text{C}}}\text{-}\underset{\parallel}{\text{C}}\text{-CH}_3$ | $\text{CR-COOH}$ $\text{CH}_3\text{-CO-}\underset{\parallel}{\text{C}}\text{-CH}_3$ | $\text{CR-COOH}$ $\text{CH}_3\text{-}\underset{\underset{\text{CR-COOH}}{\parallel}}{\overset{\parallel}{\text{C}}}\text{-}\underset{\parallel}{\text{C}}\text{-CH}_3$ |

It is evident from the table that our process involves the following novel steps:

1. Reacting the 1,2-diketones with an alcohol in excess to form the corresponding ketals.
2. Reacting the ketals with any compound capable of condensing with a carbonyl group or an alpha methyl group but not reacting with the acetal group.
3. Hydrolyzing the resulting dialkoxy-mono-derivatives of the 1,2-diketones to obtain the 1-keto-mono-derivatives, and/or
4. Reacting the 1-keto-mono-derivative with any compound capable of condensing with a carbonyl group or with an alpha methyl group, to obtain symmetrical or mixed bis-derivatives of the original 1,2-diketones.

Instead of using steps 3 and 4 it is also possible to react the di-alkoxy-mono-derivative with a compound capable of reacting with the alkoxy groups, such as hydroxylamine, for example, or to react the di-alkoxy-mono-derivative with a second keto-reactive compound in an acid medium, whereby hydrolysis takes place simultaneously with condensation, thus obtaining a mixed derivative of the 1,2-diketone. If the reactant used in step 2 is one reacting with the alpha hydrogen of the ketal, it is then possible to react the resulting derivative with a compound reactive with the keto group to form a di-derivative, which steps can be followed by reacting the di-derivative with a compound reactive with the alkoxy groups to form a tri-derivative, or by hydrolyzing the di-derivative to form the 1-keto-di-derivative, followed by condensing this 1-keto-derivative with a keto-reactive compound to form a tri-derivative.

While we have disclosed what we believe to be the more advantageous embodiments of our invention, it is evident, of course, that various modifications can be made in the specific procedures which have been outlined without departing from the purview of this invention. It is believed that anyone skilled in the art, given the assistance of the preceding disclosure, will be able to make our new ketals as well as any derivatives thereof, if consideration is taken of the fact that these ketals have the chemical properties of normal ketones having a partly blocked adjacent keto group. It is believed that these methods will open to the organic chemist the possibility of producing several new compounds as well as more advantageous ways of producing many old compounds otherwise difficult to prepare. Further modifications of this invention which fall within the scope of the following claims will be immediately evident to those skilled in the art.

What we claim is:

1. As novel products, ketals of 1,2-diketones having the general formula $$R^1\text{---}C(OR^2)_2\text{---}CO\text{---}R^3$$

wherein $R^1$, $R^2$ and $R^3$ are alkyl groups; said products being colorless, limpid, somewhat oily liquids, partly soluble in water but miscible with most organic solvents, boiling without decomposition at temperatures well above the boiling points of the diketones and alcohols from which they are formed, being readily hydrolyzed to give 1,2-diketones and alcohols, being stable in alkaline solution but unstable in the presence of acids and having the chemical properties of 1,2-diketones in which one keto group is partly blocked.

2. As novel products, the 2,2-dialkoxy-3-butanones.

3. As a novel product, 2,2-dimethoxy-3-butanone.

4. As a novel product, 2,2-diethoxy-3-butanone.

5. As a novel product, 2,2-dipropoxy-3-butanone.

DOUGLAS S. CALDER.
KENNETH BRYSON FLEER.